United States Patent [19]

Jureit

[11] 3,910,153
[45] Oct. 7, 1975

[54] WOOD JOINT AND CONNECTOR PLATES
[75] Inventor: John Calvin Jureit, Miami, Fla.
[73] Assignee: Automated Building Components, Inc., Miami, Fla.
[22] Filed: May 8, 1973
[21] Appl. No.: 358,400

Related U.S. Application Data
[63] Continuation of Ser. No. 153,169, June 15, 1971, which is a continuation-in-part of Ser. No. 815,453, April 11, 1969, which is a continuation-in-part of Ser. No. 689,017, Dec. 8, 1967.

[52] U.S. Cl. .................................. 85/13; 52/753 L
[51] Int. Cl.² ........................................ F16B 5/07
[58] Field of Search ............ 52/753 L, 753 D; 85/13

[56] References Cited
UNITED STATES PATENTS

| | | | |
|---|---|---|---|
| 3,016,586 | 1/1962 | Atkins | 52/753 L |
| 3,068,738 | 12/1962 | Nulick | 85/13 |
| 3,304,106 | 2/1967 | McCormack | 52/753 L |
| 3,322,017 | 5/1967 | Dufficy | 85/13 |
| 3,364,805 | 1/1968 | Sanford | 85/13 |
| 3,377,905 | 4/1968 | McAlpine | 85/13 |
| 3,417,651 | 12/1968 | Moehlenpah | 85/13 |

FOREIGN PATENTS OR APPLICATIONS

| 1,070,079 | 5/1967 | United Kingdom | 85/13 |
|---|---|---|---|

Primary Examiner—Werner H. Schroeder
Assistant Examiner—Wayne L. Shedd
Attorney, Agent, or Firm—LeBlanc & Shur

[57] ABSTRACT

The connector plate has a plurality of slender, nail-like teeth struck to project at right angles to the plate for embedment into adjoining wooden members. The teeth are struck in longitudinal rows, the teeth in each row being staggered relative to the teeth of next adjacent rows such that the slots in next adjacent rows extend from the teeth in opposite directions. Each of the teeth has a single lateral projecting shoulder portion adjacent the base thereof for providing increased metal at the bend axis, the slot portions left by the shoulder portions of the teeth in each row being opposite the metal portion of the plate between adjacent slots in the next adjacent longitudinal rows, thereby preserving the net section. In another form of the plate hereof, arcuate shoulders are formed on opposite sides of the tooth base. In a still further form of plate hereof, a plurality of teeth are struck from the plate and arranged in longitudinal rows with the teeth in adjacent rows having oppositely scarfed tips. A notch is provided along one edge of each tooth and on the same side thereof as its direction of movement upon embedment into the wooden members whereby improved clinching action is provided.

7 Claims, 26 Drawing Figures

INVENTOR
JOHN C. JUREIT

BY *Le Blanc & Shur*

ATTORNEYS

WOOD JOINT AND CONNECTOR PLATES

This application is a continuation of application Ser. No. 153,169 filed June 15, 1971, which is, in turn, a continuation-in-part of application Ser. No. 815,453 filed Apr. 11, 1969, which application Ser. No. 815,453 is, in turn, a continuation-in-part of application Ser. No. 689,017 filed Dec. 8, 1967.

This invention relates to metal connectors and structural wood joints aand more particularly to connectors and joints of the butt type used in prefabricated wooden structures such as roof trusses.

The joinder of structural load-bearing wooden members has recently and significantly been advanced with the advent of structural wooden joints which are connected solely by means of metal plates having slender, elongated, nail-like teeth struck therefrom and embedded in the wooden members, such as illustrated in Jureit Pat. No. 2,877,520. Plates of this type, wherein the teeth thereof serve as the only means holding the plates onto the wooden members and the wooden members in adjoining relation, have been formed of sheet metal of a thickness of at least 16 U.S. Standard gauge due to the heavy loads borne by the plates when the same are used, for example, in prefabricated roof and floor truss assemblies. Most connector plates of this type have been of a thickness of 14 U.S. Standard guage.

It has heretofore been believed that the thinner gauge metal, such as for example 18 and 20 U.S. Standard gauge, could not be employed in the formation of connector plates of this type and utilized in joints having similar loadings as the joints currently joined by 14 gauge metal plates. One of the most significant problems and limiting factors in the employment of connector plates of this type resides in the ability of the metal to withstand shear and bending stresses. This is particularly true of the metal at the base of the teeth which is deformed when the teeth are struck and bent to project from the plate. The formation of a plate from thin sheet metal, of course, reduces the structural strength of the teeth in shear at the base of the teeth. This limiting factor has dictated to a large extent the use of heavier gauge metals in the formation of plates of this type. The teeth undergo bending stresses upon insertion into the wooden joint members. These stresses are particularly high where presses of the rolling type are employed. A further limiting factor is the reduction in net section of the plate caused by the slots left in the plate by the teeth. A plate may fail in net section and thereby cause a tear or fracture across the plate.

One aspect of the present invention provides a solution to the foregoing problems by widening the teeth at their bent portions, thereby increasing the quantity of metal available to withstand the shear and bending stresses. However, by widening the hinge portions of the teeth, the widened slots left thereby in the plate reduce the overall effective net section and hence the quantity of metal available in the plate to withstand tensile loading. One of the problems therefore resides in providing an increased quantity of metal at the bent portions of the teeth to increase their shear and bending load carrying capacity and sufficient metal accross the plate to preserve the overall designed net section while compensating for the decrease in metal across the plate which is applied to reinforce the bent portions of the teeth. A further desirable characteristic is to design the teeth as to obtain optimum tooth penetration characteristics consistent with a high resistance to withdrawal.

Another aspect of the multitude of problems relating to joining the members of trusses one to the other by connector plates is the tendency of the members of the truss to walk away from the plane of the truss when connector plates are provided on one side of the truss and sheathing is applied to a face of the truss. Particularly, gable end trusses comprise upper and lower chord members joined by vertical upright supports, the supports and members being connected one to the other by connector plates. From an economic standpoint and also to facilitate fabrication of the trusses, it is desirable to utilize connector plates on only one side of the truss. Moreover, it will be appreciated that, when sheathing is applied to the external face of a gable end truss, the upright support members tend to walk away from the plane of the truss when the nails utilized to secure the sheathing to the support members are hammered to final securement. Specifically, where the plates are applied on the outer face of the gable end truss, the support members tend to be displaced away from the connector plates, the support members being withdrawn from the teeth. Where the connector plates are formed on the inside face of the gable end truss, the teeth of the plates tend to withdraw from the upper and lower chord members upon application of the sheathing. Thus, a further desirable characteristic of a connector plate is high resistance to withdrawal of its teeth from the wooden member in which they are embedded.

According to one aspect of the present invention, it has been found that by using thinner metal, such as 18 or 20 U.S. Standard gauge, in conjunction with a unique and distinct combination of tooth shapes and disposition of teeth on the plate, an effective load-bearing wooden structural joint having higher strength characteristics than normally could be expected can be provided at considerable saving in the cost of the joint. With joints constructed in accordance with the present invention, the quantity of metal per joint, as well as the cost thereof, is markedly reduced compared with the quantity of metal per joint and cost thereof required with the employment of older and heavier plates but without significant impairment of the strength and utility of the joints. In fact, the present connector plate provides unexpectedly high tensile strength, notwithstanding an apparent reduction in net section. While the plate and joint of the present invention have broad utility in structural load-bearing wooden members, their most common use lies in the field of residential home construction, and most particularly, in the manufacture of roof trusses for houses.

Accordingly, it is a primary object of the present invention to provide improved structural load-bearing wooden joints and connectors therefor wherein the connectors are of the type having a plurality of nail-like teeth struck therefrom, the connectors being formed of sheet metal having a thickness on the order of 18 or 20 U.S. Standard gauge. To provide this result employing such relatively thin metal as compared to the thicker 14 U.S. Standard gauge sheet metal commonly used for plates of this type and to achieve a joint which can withstand structural loading approaching that loading which can be carried by similar plates formed of 14 gauge metal, one form of the present invention provides for the formation of a single lateral shoulder adjacent the base of the teeth. In this manner, the quantity of metal at the bases of the teeth when the teeth are struck is substantially increased relative to the quantity of metal in the cross section of the shank of the teeth. This increases the capacity of the teeth to carry shear and bending stresses to a point very nearly the same as the load carrying capacity in shear and bending of teeth conventionally formed in 14 gauge sheet metal connector plates. Moreover, by providing one or more shoulders at the bases of the teeth, the bending stress carrying capacity is greatly increased permitting the use of roll type presses for embedding the nails.

It is another object of the present invention to provide improved structural load-bearing wooden joints and connectors therefor having a unique disposition of teeth in the plate whereby an unusually high net overall section is maintained. To this end, the teeth are struck in a plurality of longitudinal rows with the teeth in adjacent rows being struck in opposite directions and struck such that the bent metal in each row comprising the base of the teeth lies directly opposite the metal between the slots left by adjacent teeth in the next adjacent rows. The quantity of metal across the plate at any one point therefore remains at or above a designed net overall section without the necessity of increasing the spacing between the longitudinal rows of teeth due to the increased width of the slots at the struck shoulder portions thereof. The effective net section of one form of the present plate is approximately one and one-half times the apparent net section, thereby providing a plate having unexpectedly high tensile strength.

It is a related object of the present invention to provide improved structural load bearing wooden joints and connectors therefor wherein the connectors are of the type having a plurality of nail-like teeth struck therefrom with enlarged base portions of the teeth comprising arcuately outwardlyly curved edges to prevent bending of the teeth as the teeth are embedded into the wooden joint and shearing thereof. The enlarged arcuate base portions also provide an increased wedging rather than a cutting action of the wood fibers upon embedment of the teeth into the wooden members.

A further related object of the present invention is to provide a flat along opposite sides of the enlarged tooth base portions extending in the longitudinal direction of the teeth when severed from the plate whereby the nominal tear or fracture set-up in the plate caused by the die cutting operation runs substantially longitudinally along the plate. This precludes diagonal or lateral tear or fracture set-up and preserves and does not materially affect the overall effective net section.

A still further related object of the present invention is to provide a novel, improved connector plate for wood joints and the like wherein the teeth struck from the connector plate have the capacity to carry large bending stresses thereby admitting use of roller type presses for forming the joints.

It is a further object of the present invention to provide improved structural load-bearing wooden joints and connectors therefor having the foregoing characteristics wherein the joint strength per unit quantity of metal in the joint is greater than heretofore available in joints of this type.

It is a further object of the present invention to provide improved structural load-bearing wooden joints and connectors therefor having the foregoing characteristics and which are low in cost, easily and readily fabricated, and have optimum tooth density and high withdrawal resistance.

With regard to another aspect of the present invention, it is a related object of the present invention to provide a novel and improved connector plate having teeth uniquely configured to provide increased withdrawal resistance by improved clinching action upon embedment thereof into the wooden members forming the joint.

It is a further related object of the present invention to provide a connector plate particularly for use with gable end trusses wherein the tendency of the support members to move away from the plane of the truss upon application of the sheathing to one side of the truss is minimized or eliminated.

These and further objects and advantages of the invention will become more apparent reference to the following specification, claims and appended drawings, wherein:

Figure 1:
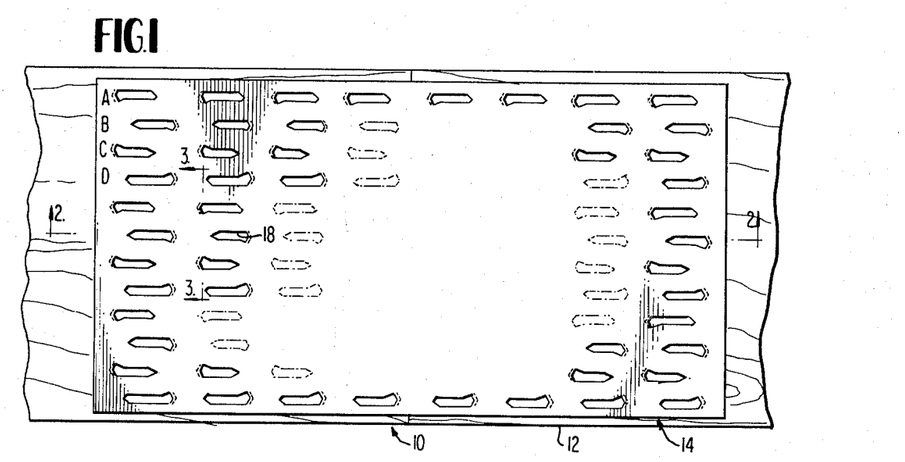
FIG. 1 is an elevational view of a connector and joint constructed in accordance with the present invention.
Figures 2, 3, 4, 5, 6:
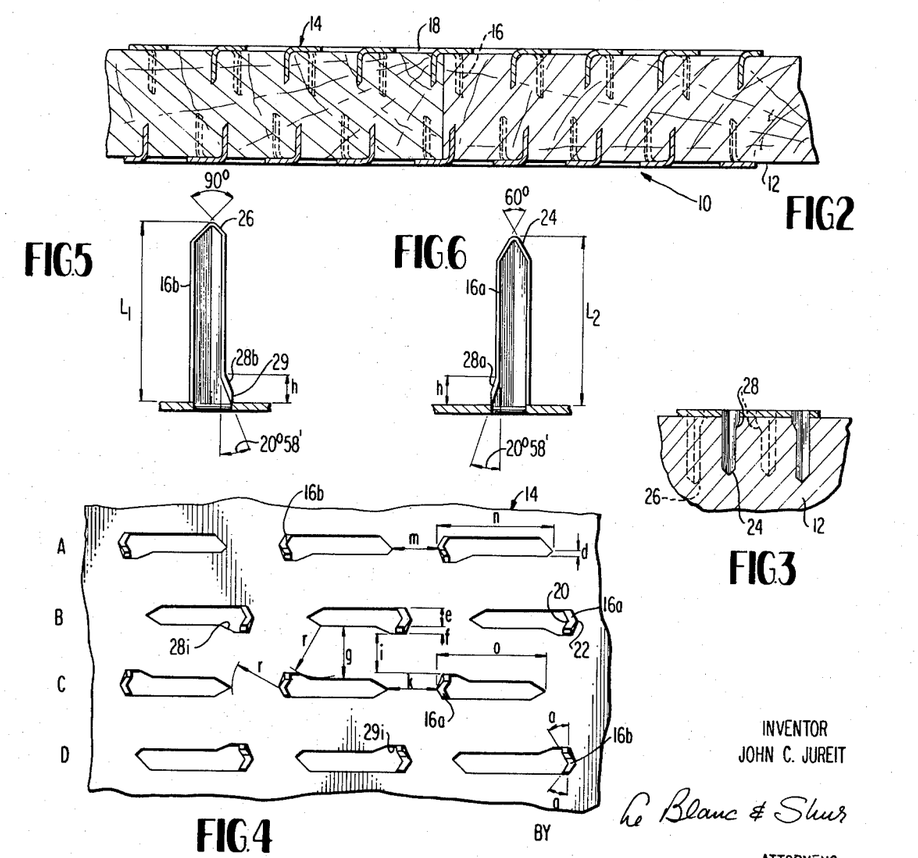
FIG. 2 is a cross sectional view of the joint and connector taken about on line 2—2 of FIG. 1.
FIG. 3 is a fragmentary cross sectional view thereof taken about on line 3—3 of FIG. 1.
FIG. 4 is an enlarged fragmentary plan view of the connector viewed from the side of the plate from which the teeth project.
FIG. 5 is an enlarged fragmentary elevational view of one of the teeth in the outer rows thereof of the plate shown in FIG. 4.
FIG. 6 is an enlarged fragmentary elevational view of one of the teeth in the inner rows thereof.

Referring now to the drawings, particularly FIGS. 1 and 2, there is shown a structural butt joint, generally indicated at 10, comprising a pair of structural load-bearing members 12 which are joined together by a connector plate, generally indicated 14. Connector plate 14 comprises a sheet metal plate having struck therefrom a plurality of longitudinal rows, A through D, of slender, elongated, nail-like teeth 16 which leave longitudinal rows of elongated slots 18. Teeth 16 are embedded in the wooden members 12 in any suitable manner, preferably by the application of pressure to the plate 14 by a suitable press as by a roller type press or the like. While only a single plate is shown in FIG. 1, it is to be understood that two plates are normally empolyed, with one plate on each side of the wooden members with the teeth in the opposed plates extending towards one another within the wooden members as seen in FIG. 2.

Teeth 16 in each longitudinal row thereof are struck in the same direction so that the slots 18 left thereby extend from the teeth in the same direction while teeth 16 in the next adjacent rows are struck in opposite directions such that the slots in adjacent longitudinal rows extend from the teeth in opposite directions. In this form, each tooth 16 is generally V-shaped in cross section (as best seen in FIG. 4) having a generally concave punch face 20, the opposite sides of which form angles preferably of 30° indicated at a, and a generally convex back face 22. The teeth in plate 14 are arranged in preferably repeating patterns of four rows of teeth and slots transversely across the plate. For reasons as will become apparent from the ensuing description and as best seen in FIG. 3, teeth 16a of the innermost pair of rows B and C of each four row repeating pattern, terminate in offset pointed ends or tips 24, commonly known as chisel-pointed tips, and the teeth 16b of the outermost longitudinal rows A and D of each four row repeating pattern terminate in scarf-pointed ends 26.

According to the present invention, an unusually high ratio of joint strength per unit weight of metal is achieved by the uniqueness of the arrangement of the teeth as well as by the particular configuration of the teeth, whereby relatively thin gauge sheet metal can be employed in most joints as compared with the heavier 14 gauge sheet metal plates presently utilized in such joints. Therefore, 18 or 20 U.S. Standard gauge sheet metal is employed in forming the connector plate of the present invention without substantial sacrifice of load carrying capability in the finished plate which might otherwise be anticipated. Accordingly, the present invention, in one form hereof, provides, as best seen in FIGS. 5 and 6, a single lateral shoulder formation 28 on one side of each tooth adjacent the base portion thereof, the shoulder formation, in this form, having a linearly extending edge. The unusually high and unexpected effective net section in the plate, the high resistance to bending upon insertion of the teeth into the members of a joint, and the unexpected high shear strength of the teeth result, in part, from the unique location of the shoulder relative to the teeth and the slot formation left thereby relative to adjacent slot formations, as hereinafter described. There is thus provided an increase in the quantity of metal at the bent base portion of the tooth in comparison with the quantity of metal which would have been bent if the tooth were struck with a constant width from its base to its tip. By providing teeth shouldered at their bases, the bent metal portions of the teeth provide additional shear and bending strength at the points therealong of maximum shear and bending loadings respectively.

Specifically, it has been found that an increase in width of approximately 50% of the tooth at its base optimally increases the overall shear loading which the tooth can withstand at its base and greatly increases the tooth resistance to bending at its base upon insertion of the tooth into the wooden members. While an increase in tooth width at its base beyond about 50% of the width of the tooth may be desirable and provide additional shear strength and resistance to bending, such additional increase in width would result in a reduction in the effective net section and would therefore not be desirable. Shoulder formation 28 is, in this tooth pattern, preferably right triangular in shape with the base of the triangle lying closely adjacent plate 14. It will be understood that shoulder formations having other configurations may be empolyed, for example, the arcuate configuration disclosed in the embodiments hereof illustrated in FIGS. 7–15.

It is another important feature of the present invention that a flat 29 is provided along the outer edge of the shoulder 28. The die, not shown, is configured to cut both the angled shoulder portion and the flat 29 from the plate leaving slot edge portions 28i and 29i, respectively. In this manner, the plate, when cut by the die, is torn for about one-half the thickness of the sheet metal in the longitudinal direction. Otherwise, the plate would tear along a line extending diagonally in the plate in substantially the same direction as the edge of the shoulder 28 extends. If the flat was not provided, a possible diagonal fracture or tear would be set-up and a loss of net section would be incurred. By providing the longitudinally extending flat, the effects of the longitudinal tear in the plate caused by the die is minimized, a diagonal or transverse tear or fracture is not set-up, and, most importantly, net section is preserved.

The disposition of shoulders 28 on the teeth relative to the disposition of adjacent teeth is particularly significant as it is an important factor in maximizing and preserving the effective net overall section. As best seen in FIGS. 3 and 4, shoulders 28b are formed on the inner sides of the outermost rows of teeth, for example, rows A and D, and shoulders 28a are formed on the inner sides of the innermost longitudinal rows of teeth, for examples, rows B and C. Teeth 16 in each row are, however, longitudinally displaced form the corresponding teeth in next adjacent rows, thus arranging the teeth in each row in staggered relation to corresponding teeth in next adjacent rows. Moreover, the rows of teeth are staggered such that the slots left by the widened base portions of the teeth in each longitudinal row are transversely opposite the reduced slot formations left by the pointed or scarfed ends of the teeth in the next adjacent longitudinal row of teeth and the metal portions between the ends of longitudinally adjacent slots in such next adjacent longitudinal row. By positioning the widened base portions of the teeth in this manner, the maximum net reduction in width and hence the effective net section across the plate at any one point therealong is substantially equal, in the preferred form, to four times the normal slot width. Since the widened base portions are disposed relative to the next adjacent transverse slots as to lie opposite the pointed slot formations and the metal portions between the slots, the net section is preserved and will not be reduced to a greater extent than the reduction cause by the width of the shank portions of the slots. The effective tensile loading which the plate of the present invention can withstand is principally determined by the quantity of the metal across the plate and the maximum shear load which the shank portion of the teeth can withstand.

As best seen in FIG. 3, the teeth $16a$ forming the innermost pairs of rows, for example, rows B and C, of each transversely repeating pattern of four rows of teeth are struck as to be slightly shorter in length than the teeth $16b$ forming the outermost pair of rows, A and D. This particular arrangement of teeth facilitates the placement of the teeth on the wooden members in proper position and it has been found that unusually high insertion pressures are not required. The scarf-pointed tips 26 on the outermost rows of teeth of each repeating pattern of four rows of teeth are angled such that the teeth tend to converge one towards the other as the plate is embedded into the wooden members, thereby providing a clinching action which increases the withdrawal resistance of the plate from the wooden members.

It has been found that certain dimensional relationships in the foregoing slot and teeth arrangement result in an unexpectedly high effective net section, providing a plate having a surprisingly and unusually high tensile strength. The dimensions of a specific preferred embodiment of the present invention are provided below, it being understood that the dimensions per se are given for example only, and that such dimensions are used only to illustrate numerical ratios providing dimensional relationships which impart such high strength characteristics to the plate.

According to a specific preferred embodiment of the present invention, the width of each of the teeth indicated at $e$ is 0.074 inch, while the width of shoulder 28 indicated at $f$ is 0.032 inch. The ratio of $f/e$ is therefore 0.43 and ought not to exceed 0.5 inch in order that the net section be maintained. The shortest actual distance $g$ between transversely adjacent slots 18 is 0.174 inch, while the apparent minimum distance $i$ therebetween is 0.11 inch. Accordingly, the ratio $g/i$ of actual net section to apparent net section is 0.174/.11 or 1.58 inch. Thus, the actual net section is approximately one and one-half times the apparent net section, thus providing an unexpected increase in the tensile strength of the plate. Note that the distance between the transversely adjacent slots at any point therealong is never less than the transverse distance between the shank portions of these slots which, in this form, is 0.174 inch and that the side edge of the enlarged slot left by shoulder 28 as well as the short side of the shank portion of the slot are tangent to an arc swung from the closest point, indicated at $j$, in the next adjacent transverse slot, i.e., a the closest edge of the shank portion of the next adjacent slot. The lengths $L_1$ and $L_2$ of the outer rows (A and D) and inner rows (B and C) of teeth 16 are respectively 0.375 and 0.344 inch, providing a preferred ratio of the lengths of outer teeth to inner teeth of 1.090. The length $h$ (FIGS. 5 and 6) of shouldered portion 28 including flat 29 is 0.088 inch, providing a tooth to shoulder length ratio of 4.30 and 3.90 for the teeth forming the outer and inner rows, respectively. These ratios ought not be below 3.5 as considerably higher insertion pressures are required when the shoulder portion extends for more than approximately a third of the length of the teeth. Moreover, lower ratios would introduce additional metal into the teeth which would be unnecessary and, accordingly, would not provide optimum strength per unit weight of metal in the connector. The length of the flat 29 is 0.005 inch, and preferably lies within a range of 0.003 to 0.008 inch. The distances $k$ and $m$ between the backs of the teeth and the next adjacent longitudinal slot in the inner and outer rows thereof are respectively 0.174 and 0.110 inch, which provides a ratio of 1.24. It will be noted that the distance between the back of the inner teeth and the next adjacent longitudinal slot is the same as the radius $r$ of the arc of the circle swung between transversely adjacent slots as previously discussed, thus maintaining an unusually high effective net section. The overall distance from the backs of the teeth to the points of their associated slots is greater in the outer rows than in the inner rows, such distances in the outer and inner rows being 0.42 and 0.385 inch, respectively, indicated an $n$ and $o$, providing a ratio of outer to inner overall lengths of 1.09. The latter ratio is preferably not greater than 1.2 to minimize insertion pressure, otherwise higher insertion pressures would be required. It will be noted in FIGS. 5 and 6 that the angles formed by the tips of the scarf and chisel pointed teeth are 90° and 60°, respectively, the former providing a greater angled edge than the latter to facilitate the clinching action, while the latter has equally angled edges for direct insertion normal to the wood. The lateral distance between the edge of the slot and the scarf point in the outermost rows of teeth is 0.016 and the chisel pointed tips on the innermost teeth lie on the midline of the shank portion of such teeth. The lateral distance between the edges of the slots in the outer rows of teeth to the edges of the plate is 0.09 inch and it is significant that the shoulders 28 are on the sides of the outermost slots remote from the plate edges to preclude the formation of narrow weakened areas therealong or the set-up of fractures or tears along the plate edges. This factor also contributes to optimal strength per unit weight of metal in the plate. All of these dimensional relationships result in unexpectedly high net section providing unusual high tensile strength.

It will be appreciated that the drawing illustrates a single plate and that the plate hereof can be formed to a larger or smaller lateral dimension as well as to a longer or shorter dimension in length.

The net reduction in metal material due to the formation of the slots in the plate is approximately 30% of the plate cross section and it can be seen that, with the foregoing arrangement of the rows of teeth, the net section across the plate at any of the shouldered portions of the teeth is no less than 70% of the width of the plate and, in fact, is considerably more. Thus, the added strength provided by the shouldered teeth permits the use of the thinner 18 or 20 U.S. Standard gauge metal (nominal thicknesses 0.0516 and 0.0396 inch, respectively) in joints heretofore requiring heavier gauge metal, such as 14 gauge, and of similar dimensions with the 18 or 20 gauge plate thus formed being able to withstand loading heretofore requiring the use of the heavier 14 gauge plates. The unexpected and unusual high strength per unit weight of metal obtainable with the foregoing plate construction permits the use of the much thinner 18 or 20 gauge sheet material and results in a considerable cost advantage. In the preferred embodiment, the lengths of the inner and outer rows of teeth, as previously mentioned, are 0.344 and 0.375 inch, respectively, and the ratio of tooth length to plate thickness (20 gauge galvanized steel having a thickness of 0.0396 inch) is approximately 8.7 and 9.5 respectively.

Referring now to the embodiment illustrated in FIGS. 7–12, there is shown a structural butt joint 10a comprising a pair of butted load bearing members 12a which are joined together by a connector plate, indicated at 34, on opposite sides of the joint. As in the previous embodiment, connector plate 34 comprises a sheet metal plate having struck therefrom a plurality of longitudinally extending rows of elongated nail-like teeth 36 leaving longitudinal rows of elongated slots 38. Teeth 36 in each longitudinal row are struck in the same direction so that the slots 38 left thereby extend from the teeth in the same direction while the teeth 36 in the next adjacent rows are struck in opposite directions such that the slots in such adjacent longitudinal rows extend from the teeth in the opposite direction. To prevent bending of the teeth upon embedment thereof into the members 12a and to provide increased shear strength across the base portions of the teeth, the teeth in this embodiment are provided with arcuate shoulders 40 (FIG. 11) along opposite sides of each tooth adjacent the base portions of the teeth. The radiused shoulders 40 optimize the resistance to bending of the tooth upon embedment into the wooden members 12a. Particularly, the radiused shoulders provide for a gradual increase in the press tonnage required to embed the shoulders into the wood. This is particularly advantageous wherein a toggle type press, not shown, is employed as maximum tonnage is applied near the bottom of the toggle press stroke and the applied and required tonnage or force curves for driving this type of plate into the wooden members by a toggle type press closely correspond in a non-linear fashion. Moreover, the radiused shoulders 40 tend to gradually wedge and separate the wood fibers upon insertion rather than to cut the fibers. This provides a greater resistance to withdrawal. As in the previous form, the additional metal provided at the base portions of the teeth by the radiused shoulder forms teeth having substantially increased resistance to shear.

As in the previous form, a flat 42 is formed along the side edges of the tooth adjacent the plate from the outermost radiused portions of radii 40 to the plate. Specifically, the die is formed to cut the plate in the longitudinal direction as indicated at 42s to form the flat 42. Thus, any fracture or tear set-up in the plate caused by the die punching operation tends to extend in a longitudinal direction rather than a diagonal or lateral direction. This preserves the overall effective net section of the plate should a substantial tear or fracture occur in this area.

It is another feature of this form of the present invention that the teeth are substantially reinforced in an axial direction by providing a novelly improved tooth cross section. As seen particularly in FIGS. 9 and 11, each tooth 36 has a wagon track, generally indicated at 44, along its punch face which extends the full length of the tooth from its tip to the base portion of the tooth and throughout the thickness of the plate. In cross section, wagon track 44 comprises a pair of side tracks 46 forming the punch face portions of the shoulders 40 and a central axially extending track 48 recessed inwardly from side tracks 46. A pair of lengthwise extending tracks 50 are formed on opposite sides of the central track 48 and are bevelled or angled inwardly. These distinct planar surfaces or tracks 48 and 50 extend from the face of the plate opposite the teeth through the plate and along the inside or punch face of tooth 36 to adjacent the opposite end of the tooth. The outer face of each tooth constitutes a mirror image of the inner punch face. In this fashion, the wagon track configuration of the teeth provides substantial and increased reinforcement throughout the full length of the teeth from its tip to the plate.

Figure 7:
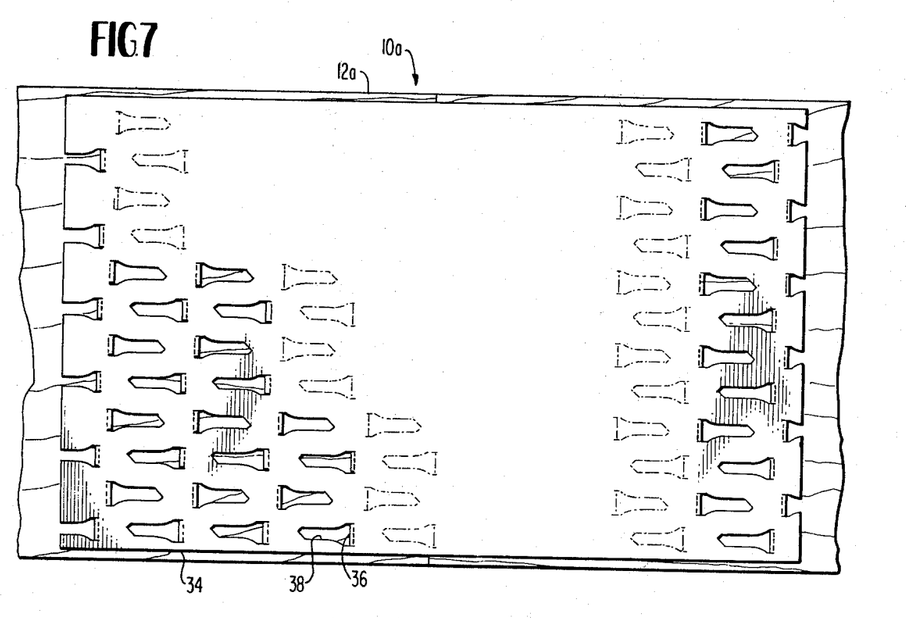
FIG. 7 is an elevational view of another form of connector and joint constructed in accordance with the present invention.
Figure 8:
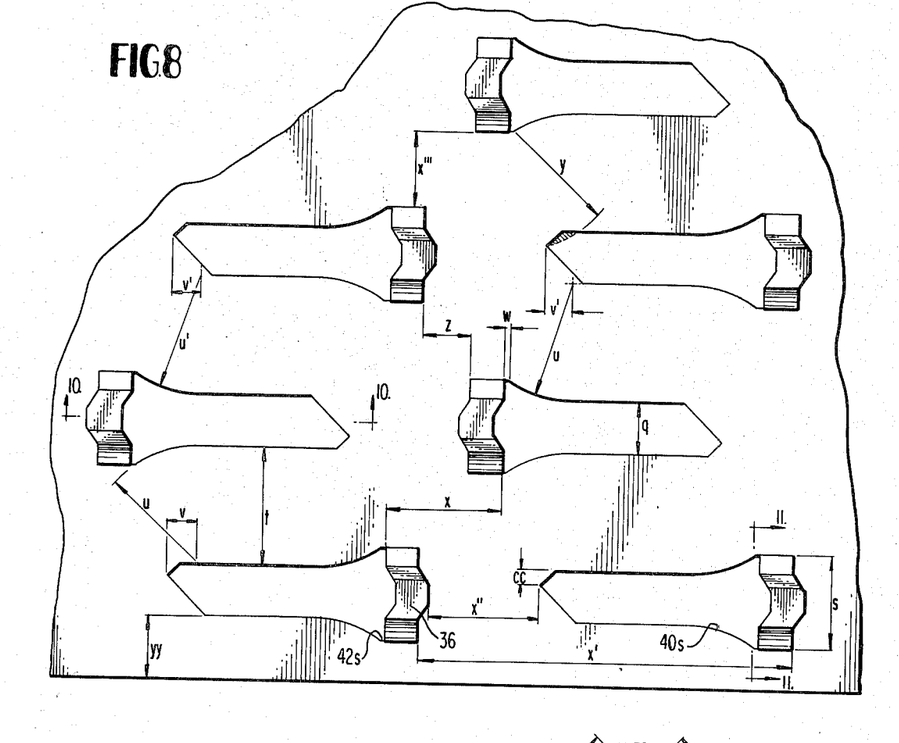
FIG. 8 is an enlarged fragmentary plan view of the connector illustrated in FIG. 7 as viewed from the side of the plate from which the teeth project.
Figure 11:
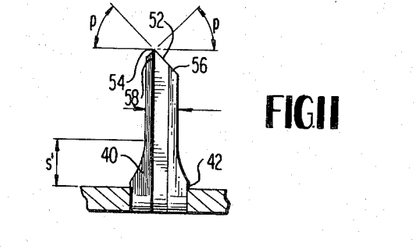
FIG. 11 is a reduced cross sectional view taken generally about on line 11—11 in FIG. 8.

The teeth 36 in the form illustrated in FIGS. 7–11 are provided with scarf pointed ends 52, as best seen in FIG. 11. The tip 54 of the tooth lies offset from the central axis thereof, and the linear sides of the tip portion 52, i.e., sides 56 and 58, extend at angles to the plane through the tip 54 parallel to the plate of about 45°. As seen in FIGS. 7 and 8, the teeth 36 in each longitudinal row are scarfed in like directions whereas the teeth in adjacent longitudinal rows are scarfed in the opposite direction. Thus, when the teeth are embedded into members 12a, the scarf pointed ends of the teeth in adjacent rows tend to bend the teeth transversely toward one another to provide a clinching action in the wood members 12a.

It is a further feature of this form of the present invention that the teeth are arranged in longitudinal rows in a manner as to preserve the effective net section thereby eliminating fracture or tear caaused by inadequate net section and thereby affording increased resistance in tension. As can be seen in FIGS. 7 and 8, the teeth in adjacent longitudinal rows are staggered relative to one another, i.e., are longitudinally displaced from the corresponding teeth in the next adjacent row. As in the previous embodiment, the rows of teeth are staggered such that the arcuate slot portions left by the widened base portions of the teeth in each longitudinal row are transversely opposite the reduced slot formations left by the scarf pointed ends of the teeth in the next adjacent longitudinal row of teeth and the metal portions between the ends of longitudinally adjacent slots in such next adjacent longitudinal rows. Thus, the net section transversely of the plate is preserved. Moreover, net section is preserved between the radiused portions of the slot left by the teeth and the tip portions of the slots in the next adjacent longitudinal row of slots as more particularly noted hereinafter.

Certain dimensional relationships in the foregoing described slot and teeth arrangement are required in order to preserve the effective net section thereby providing a plate having unusually high tensile strength and to provide teeth having substantially increased resistance to bending and shearing. According to a specific preferred embodiment of the present invention, the width of the shank portion of each of the teeth indicated at $q$ in FIG. 8 is 0.074 and the width of the shouldered base portion indicated at $s$ is 0.136 inch. The ratio of $s/q$ is therefore 1.84. In this form, the shortest actual distance $t$ between the edges of the transversely adjacent slots is 0.174 inch. The radius $u$ forming the lowermost shoulder on the teeth illustrated in FIG. 8 is also 0.174 inch from a center on the slot edge of the next transversely adjacent slot spaced back from the tip of the slot a distance of 0.04 inch indicated at $v$. The radius $u'$ for the arcuate shoulder 40 on the opposite side of the teeth is swung from a center located on a line forming a longitudinal extension of the nearest edges of the next transversely adjacent slot and spaced back from the tip of such slot a distance of 0.04 inch indicated at $v$.

Figure 9:
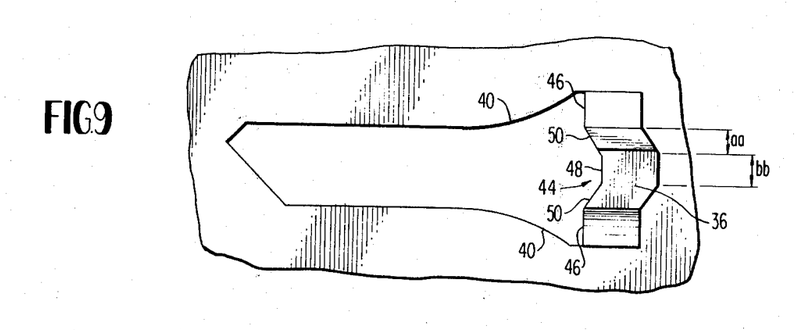
FIG. 9 is an enlarged fragmentary view of the plate illustrating one of the teeth and the slot from which the tooth is struck.
Figure 10:
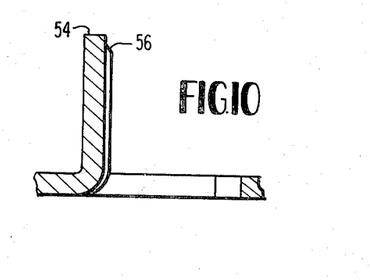
FIG. 10 is a reduced cross sectional view of the plate and tooth taken generally about on line 10—10 in FIG. 8.

In the preferred form hereof, the flats 42 formed along opposite sides of the base portions of the teeth indicated at $w$ in FIG. 8 are preferably 0.003 inch. The longitudinal distance $x$ between the punch face of a tooth in one longitudinal row and the punch face of the nearest tooth in the next adjacent longitudinal row is 0.161 inch and ought not be less than 0.150 inch to avoid failure in net section. This dimension ought not be greater than 0.170 in order to optimize tooth density throughout the plate. The distance between the teeth in each longitudinal row is 0.562 inch as indicated at $x'$ in FIG. 8. The distance between the tips of the slots and the backs of the nearest teeth in each longitudinal row is 0.168 inch, as indicated at $x''$, for 20 gauge sheet metal and 0.156 for 18 gauge sheet metal. The preferred length of the teeth from the face of the plate from which the teeth project to the tip of the teeth including the flats is 0.325 inch. The length $s'$ of the shoulder from the face of the plate along the tooth is 0.107 providing a preferred shoulder to tooth length ratio of 0.33 and this ratio should not exceed 0.40 if optimum penetration characteristics are to be maintained and net section in the plate preserved. Note that with the foregoing dimensions, the distance between the slots in adjacent longitudinal rows is maintained at 0.174 inch except for the area of the tip of the slot within a circular arc indicated at $y$ from the corner of the flat and the radius 40$s$, the area of the tip of the slot thus circumscribed being indicated by the dot-dash lines in FIG. 8. However, it has been found that this apparent reduction in net section from the constant 0.174 inch between adjacent rows of teeth does not, in fact, affect the actual net section of the plate and failure has not occurred along this radius $y$. Moreover, the apparent net section between the edges of the teeth in next adjacent longitudinal rows indicated at $x'''$ is 0.110 inch. The ratio of $x/x'''$ is therefore 1.46 and should be maintained within a range of 1.3 to 1.7 to avoid fracture in the plate between such adjacent teeth in the low side of the ratio range and to provide optimum tooth density in the plate without setting up a substantially longitudinal fracture or tear in the plate in the high side of the ratio range. It will be noted that the distance between the backs of the teeth in adjacent longitudinal rows indicated at $z$ is 0.101 for a 20 gauge plate and 0.089 for an 18 gauge plate. The distance between the center line of the outer rows of teeth and the edges of the plate is 0.124 as indicated at $yy$. As seen in FIG. 9, the width of the angled tracks 50 are 0.025 inch as indicated at $aa$ while the width of the center track 48 indicated at $bb$ is 0.024 inch. The tips of the scarfed teeth are located 0.014 inch from their nearest side edges ad indicated at $cc$ in FIG. 8.

Figure 12:
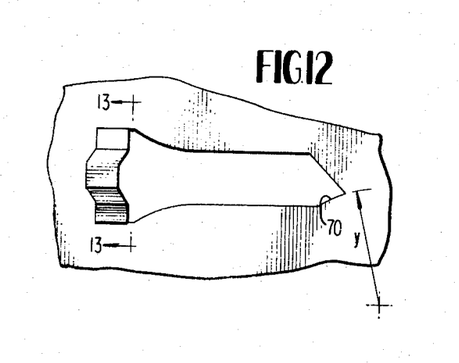
FIG. 12 is a plan view of another form of tooth and slot employed with the connector hereof.
Figure 13:
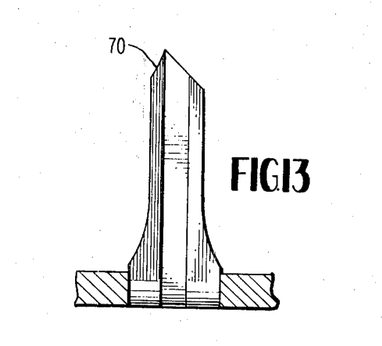
FIG. 13 is a cross sectional view thereof taken generally about on line 13—13 in FIG. 12.

Referring now to FIGS. 12 and 13, it is possible to maintain the 0.174 inch net section between adjacent rows of teeth by forming the short side 54 of the scarfed tooth tips to a concave surface as indicated at 70 in FIG. 13. Thus, with reference to FIG. 12, it will be seen that the radius $y$ swung from the juncture of the flat 42 and the radiused shoulder of the next adjacent tooth is maintained at 0.174. Not only is the net section actually preserved, but the formation of the concavity on the one side of the scarfed pointed tooth facilitates embedment of the teeth into the wood by separating the wood fibers rather than cutting them. The tooth illustrated in FIGS. 12 and 13 and its arrangement in the plate in all other respects is identical to the teeth and pattern thereof of FIGS. 7–11.

Figure 14:
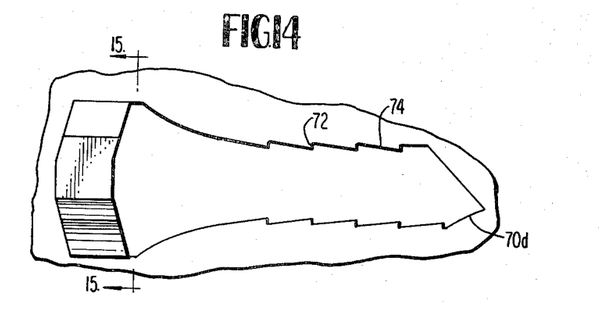
FIG. 14 is an enlarged view of still another form of tooth and slot for the connector hereof.
Figure 15:
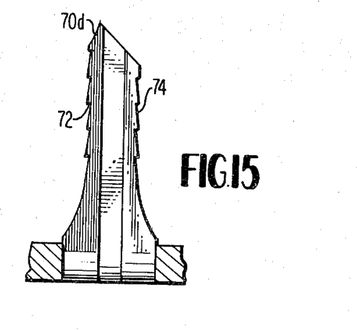
FIG. 15 is a cross sectional view thereof taken about on line 15—15 in FIG. 14.

Referring now to the form of tooth illustrated in FIGS. 14 and 15, the tooth shape and arrangement in the plate is essentially identical with the tooth shape and arrangement illustrated in FIGS. 7–11 with the exception that a plurality of shoulders 72 are formed along the opposite side edges of the tooth. The width of the shank portion of the tooth remains the same at 0.074 inch and the edges of the teeth are tapered slightly inwardly as at 74 to form the shoulders 72. As seen, four shoulders are provided along one side of the tooth while five shoulders are provided along the opposite side. The short side of the scarf tip point is provided with a concave edge 70$d$ similarly as in the form of tooth illustrated in FIGS. 12–13. Alternatively, this edge 70$d$ could be linear similarly as the tip edges 54 as in FIGS. 7–11. The arrangement of the teeth and the plate is identical to the arrangement of the teeth shown in FIGS. 7 and 8 and it will be appreciated that the tapered edges 74 facilitate insertion of the teeth into the wood and that the shoulders 72 optimize the resistance to withdrawal when the teeth of this embodiment are embedded into the structural members 12$a$.

Figure 16:
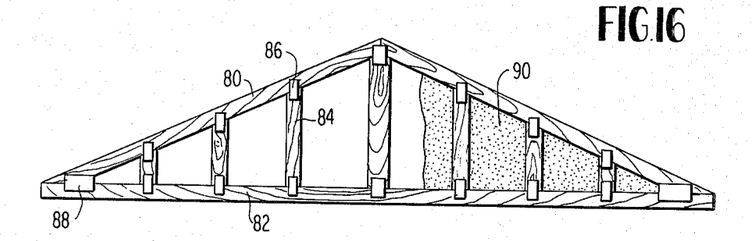
FIG. 16 is a side elevational view of a gable end truss with sheathing applied and portions thereof broken out for ease of illustration.

Referring now to the embodiment hereof illustrated in FIGS. 16–22, there is illustrated in FIG. 16 a gable end truss comprising upper aand lower chord members 80 and 82, respectively, and joined one to the other by vertically extending uprights 84. Uprights 84 are connected at opposite ends to chords 80 and 82 by connector plates 86 of the type specifically illustrated in FIGS. 17–20. The chords 80 and 82 are, of course, connected at the end of the truss by a connector plates 88 which may be of the type disclosed in this embodiment of the invention or of the type disclosed in my prior U.S. Pat. No. 2,877,520, of common assignee herewith. A sheathing 90 is applied, by nailing, to one face of the gable end truss when the truss is installed in a building. The plates 86 are preferably disposed solely on one side of the gable end truss and it will be appreciated that nailing the sheathing to the uprights 84 causes the uprights to walk away from the plane of the truss, i.e., walk laterally away from the chords 80 and 82 in a direction normal to the truss plane. Connector plates 86 are specifically configured to provide improved resistance to withdrawal by an improved clinching action whereby the tendency of uprights 84 to walk away from the plane of the truss in response to the hammering of nails into thee truss securing sheathing 90 to uprights 84 is reduced or eliminated.

To the foregoing ends, there is illustrated in FIGS. 17–20, a connector plate 86 comprised of a sheet metal plate having struck therefrom a plurality of longitudinally arranged rows of slender elongated nail-like teeth 92 which leave longitudinally spaced and extending rows of elongated slots 94. The teeth 92 in each longitudinal row are struck in the same direction such that the slots 94 left thereby extend from the teeth in the same direction. The teeth 92 in next adjacent rows of teeth are struck in opposite directions such that the slots 94 in adjacent longitudinal rows extend from the teeth in opposite directions. In the illustrated form, each tooth 92 is flat in cross section but may have a generally shallow V-shaped cross section with a concave punch face as in the prior embodiments. Moreover, the teeth in each row are provided with pointed ends scarfed in like directions. That is to say, each tooth end has an inclinded edge 96 which extends from one side edge of the the tooth to the opposite side terminating in a tip 97. The tooth thus includes a side edge 98 shorter than the opposite side edge 99 which also contains tip 97. The teeth in next adjacent rows, however, have oppositely scarfed ends. Accordingly, upon embedment of the teeth 92 into the joint formed by the uprights 84 and chords 80 or 82, the teeth in adjacent rows with the longer edges 99 thereof next adjacent one another tend to move laterally toward one another and clinch the wood therebetween. The tips of the teeth 92 may, however, be configured, if desired, similarly as illustrated in FIGS. 5, 11 and 13.

Figure 20:
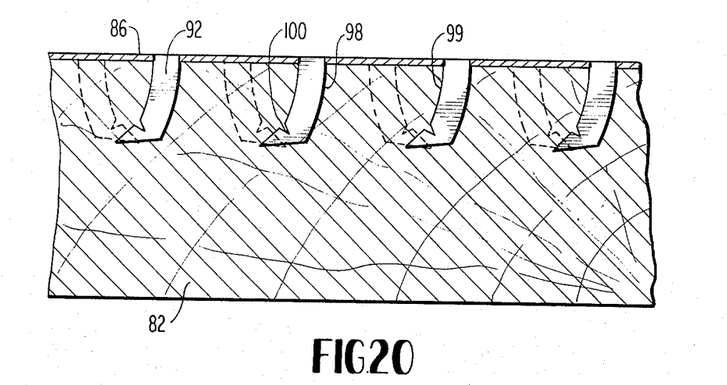
FIG. 20 is a view similar to FIG. 19 illustrating the teeth fully embedded into the members of the joint.

To provide plates having an improved clinching action which is particularly illustrated in FIG. 20, there is provided in each tooth 92 a notch or recess 100 along the same side edge thereof as the direction in which the teeth move upon embedment into the wooden members. Notch 100 is preferably a V-shaped notch wherein the apex 102 defines with the nearest opposite edge portion of the tooth a tooth portion of reduced width and at a location along the tooth greater than one-half the length of the tooth. That is to say, notch 100 is located in the distal half of the tooth remote from plate 86 and is preferably locaated adjacent the tip of the tooth for reasons as will become apparent.

It will be appreciated that this reduced width portion of the tooth constitutes the narrowest portion of the tooth throughout its entire length and consequently the weakest portion thereof. Upon embedment of teeth 92 into the wooden members, the reduced width portion permits the tip portion of the tooth outwardly of the notch to bend in the same lateral direction as the teeth move by virtue of their scarf pointed ends. Thus, when each tooth 92 is embedded into a wooden member, the side of the generally V-shaped notch 100 closer to the tip of the tooth moves toward the opposite side of the V-shaped notch whereby the tip portion essentially pivots about the reduced width portion also causing the remaining portion of the tooth to pivot in a like direction but to a lesser extent. That is to say, the tip portion of the tooth bends about the reduced width portion such that the axis of the tip portion extends at a substantial angle to the direction of movement of the plate toward the wooden member and at an angle to the central axis of the remaining portion of the tooth. Thus, by providing notches 100, a greater lateral bending and consequently more significant clinching action is effected as particularly illustrated in FIG. 20. The clinching action, of course, reduces the tendency of the teeth to withdraw from the wooden members or conversely the tendency of wooden members to withdraw from the teeth. The teeth are accordingly provided increased withdrawal resistance. Thus, utilization of plates having teeth of the foregoing described type are particularly effective where the plates are embedded into solely one side of trusses, and particularly gable end trusses wherein the support members of the truss are prevented from walking away from the plane of the truss when sheathing is applied thereto.

Figure 17:
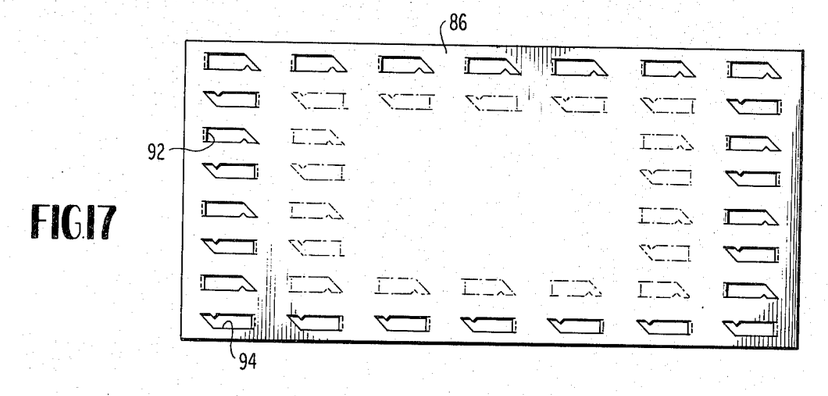
FIG. 17 is a plan view of a connector plate constructed in accordance with another aspect of the present invention and particularly useful with the gable end truss depicted in FIG. 16.
Figure 18:
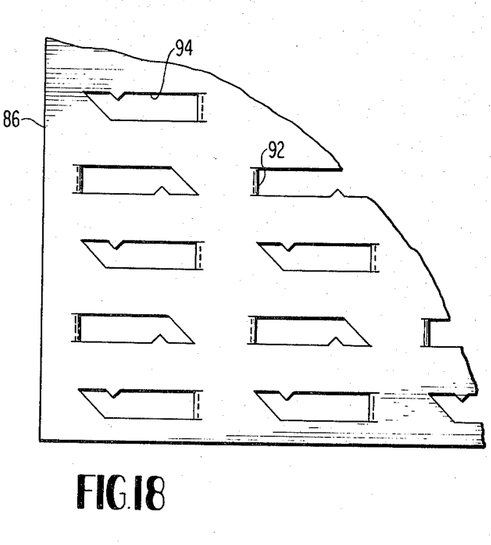
FIG. 18 is an enlarged fragmentary plan view of the connector illustrated in FIG. 17 viewed from the side of the plate remote from the teeth.
Figure 19:
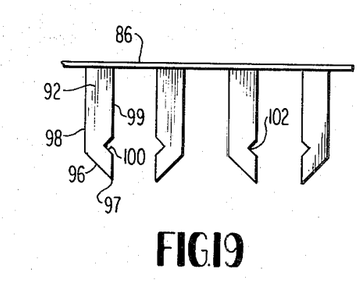
FIG. 19 is an end view of the plate illustrating the longitudinally extending rows of teeth.
Figure 21A:
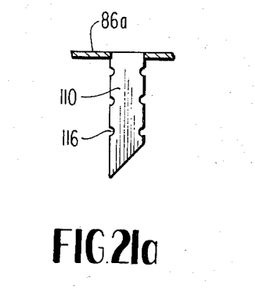
FIGS. 21a, 21b and 21c are enlarged fragmentary elevational views of several forms of teeth for use with the embodiment of plate hereof illustrated in FIG. 17.
Figure 21B:
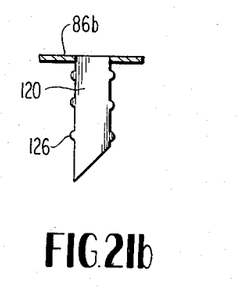
Figure 21C:
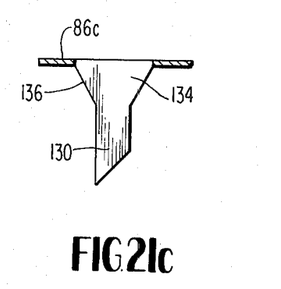

Various forms of teeth having improved withdrawal resistance are illustrated in FIGS. 21a-21c for use in the plate configuration illustrated in FIG. 17. Particularly, the tooth 110 shown in the plate 86a is provided with a plurality of longitudinally spaced recesses 116 along each of the opposite side edges of the tooth. The recesses are generally arcuate in form and lie in lateral registry one with the other along the opposite side edges of the teeth. It will be appreciated that, upon embedment of the teeth into a wooden member, the fibers of the wood expand and engage within the recesses. This engagement enhances the withdrawal resistance of the tooth and this, in combination with the greater tendency of this tooth to shift in a lateral direction, provides an improved clinching action. It will be appreciated that, since the recesses 116 along opposite side edges of the teeth lie in lateral registry one with the other, portions of reduced width and hence strength are provided. This provides for greater bending action of the teeth in a lateral direction upon embedment than would normally be the case without the recesses.

Figure 22A:
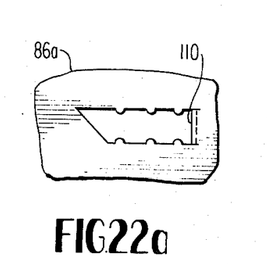
FIGS. 22a, 22b and 22c are enlarged fragmentary plan views of portions of the plate from which the teeth illustrated in FIGS. 21a, 21b and 21c, respectively, are struck.
Figure 22B:
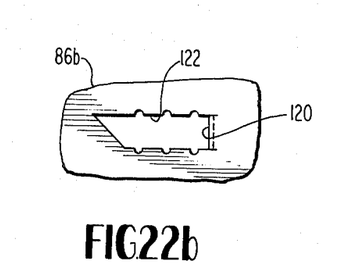

Referring to the form of tooth 120 hereof illustrated in FIG. 21b and the slot 122 left in the plate 86b illustrated in FIG. 22b, tooth 120 has a plurality of lateral projections 126 at longitudinally spaced positions along the length of the teeth. The fibers of the wood, upon embedment of this tooth, are first pushed out of the way rather than cut upon insertion of the tooth into the wood. The fibers then return into the areas between the projections to provide increased resistance to withdrawal.

Figure 22C:
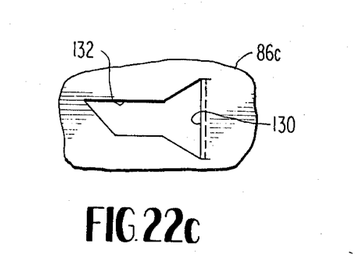

In FIGS. 21c and 22c, there is illustrated a tooth 130 and slot 132, respectively. Tooth 130 has an enlarged base portion 134 formed by shoulders 136 extending from the side edges of the tooth laterally outwardly to the plate. Here again, the teeth are provided in the arrangement illustrated in FIG. 17 and it will be appreciated that the increased area of the tooth surrounding the base portion not only increases the strength of the connection in shear, but also increases its withdrawal resistance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A connector comprising a sheet metal plate having a thickness substantially no greater than 18 U.S. Standard Gauge, said plate having a plurality of slender, elongated, nail-like teeth struck therefrom and bent about axes substantially parallel to the plane containing said plate to leave a plurality of longitudinally spaced elongated slots lying generally in laterally spaced, substantially parallel rows; each of said teeth being struck to define a substantially V-shaped cross section; said teeth having base portions adjacent said plate, intermediate portions and opposite pointed end portions; each of said base portions including a lateral shoulder projecting from only one side edge of the associated tooth to form an integral lateral extension thereof, the other side edge of said tooth extending in a straight line along said base and intermediate tooth portion to said pointed end portion; each of said shoulders being struck integrally with its associated tooth to leave a laterally enlarged slot formation in one side edge of the associated slot and adjacent the end of said slot from which the associated tooth projects; the edge portion of each of said slots opposite the associated tooth being pointed with the side edge of each said slot on the same side thereof as its associated enlarged slot formation extending in a straight line from said enlarged slot formation to said pointed end edge portion, the opposite side edge of said slot extending in a straight line from the associated tooth to the pointed end edge portion of said slot; the bent portions of said teeth having greater lateral extent than the width of the intermediate portions of the teeth, said bent tooth portions in one row of teeth lying in substantial lateral alignment with the metal plate portions extending between and bridging the longitudinally adjacent slots in at least a next adjacent row of teeth; each of the laterally enlarged slot formations of said one row of teeth lying in substantial lateral alignment with a corresponding plate portion in said next adjacent row of teeth extending between the juncture of the pointed end edge portion and the linearly extending side edge of an associated laterally adjacent slot and the tooth associated with the next longitudinally adjacent slot, at least a portion of each laterally enlarged slot formation lying in lateral alignment with a portion of the slot in the next adjacent row extending betwen the pointed end thereof and the juncture between the linearly extending side edge portion of such slot and its pointed end edge portion whereby the net reduction of sheet metal in said plate at aany one transversely extending cross section through the plate due to the formation of said slots is no greater than the sum of the cross-sectional areas of the slot portions from which said intermediate tooth portions are struck, said teeth being struck to comprise at least four parallel rows, the teeth forming the outermost pair of rows being longer in length than the length of the teeth forming the innermost pair of rows, the laterally enlarged slot formations of said one row of teeth lying on the side of slot formations nearest the slot formations of the next adjacent row of teeth, the laterally enlarged slot formations of said next adjacent row of teeth lying on the side thereof nearest the slot formations of said one row of teeth.

2. A connector according to claim 1 wherein the edge of said laterally enlarged slot formation and the side edge of said slot on the same side thereof as said enlarged slot formation lie tangent to the arc of a circle swung from the closest point thereto coincident with the opposite side edge of a next transversely adjacent slot, the teeth in each of said inner rows being spaced longitudinally from the closest next adjacent slot a distance equal to the radius of the arc of the circle.

3. A connector according to claim 1 wherein the outermost rows of teeth have oppositely scarfed tips and said innermost rows of teeth have chiseled tips.

4. A connector according to claim 1 wherein the shoulders of the teeth in at least a pair of next adjacent rows thereof extend from the teeth in the same lateral direction.

5. A connector according to claim 1 wherein said plate is formed of 20 U.S. Standard gauge sheet metal.

6. A connector according to claim 1 wherein teeth in each of said rows are struck in opposite directions relative to the teeth in the next adjacent rows such that slots in each row extend from their associated teeth in a direction opposite to the direction that slots in the next adjacent rows extend from their associated teeth.

7. A connector according to claim 1 wherein said plate is formed of 20 U.S. Standard gauge sheet metal and said teeth have a length at least eight times the thickness of said plate.

* * * * *

UNITED STATES PATENT AND TRADEMARK OFFICE
CERTIFICATE OF CORRECTION

PATENT NO. : 3,910,153
DATED : October 7, 1975
INVENTOR(S) : John Calvin Jureit

It is certified that error appears in the above-identified patent and that said Letters Patent are hereby corrected as shown below:

Column 4, line 17, "apparent reference" should read --apparent upon reference--

Column 5, line 24 "empolyed" should read --employed--

Column 6, line 29 "empolyed" should read --employed--

Column 7, line 66, delete "a"

Column 8, line 29, "an" should read --at--

Column 10, line 39, "caaused" should read --caused--

Column 12, line 41, "aand" should read --and--.

Signed and Sealed this

Nineteenth Day of April 1977

[SEAL]

Attest:

RUTH C. MASON
*Attesting Officer*

C. MARSHALL DANN
*Commissioner of Patents and Trademarks*